(12) United States Patent
Lapinski et al.

(10) Patent No.: US 8,758,599 B2
(45) Date of Patent: Jun. 24, 2014

(54) REFORMING CATALYST AND PROCESS

(75) Inventors: Mark Paul Lapinski, Aurora, IL (US); Paul Barger, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 249 days.

(21) Appl. No.: 13/184,248

(22) Filed: Jul. 15, 2011

(65) Prior Publication Data

US 2013/0015103 A1     Jan. 17, 2013

(51) Int. Cl.
    *C10G 35/06*      (2006.01)
    *C10G 35/085*      (2006.01)
    *C10G 35/09*      (2006.01)
    *B01J 21/04*      (2006.01)
    *B01J 23/63*      (2006.01)

(52) U.S. Cl.
    USPC ........... 208/138; 208/139; 208/140; 502/100; 502/240; 502/242; 502/258; 502/263

(58) Field of Classification Search
    CPC .......... B01J 23/63; B01J 27/13; B01J 27/135; C10G 35/09
    USPC ................. 502/100, 232, 204, 242, 258, 263; 208/46, 133, 134, 135, 137, 138, 139, 208/140
See application file for complete search history.

(56) References Cited

U.S. PATENT DOCUMENTS

| | | | |
|---|---|---|---|
| 2,620,314 A | 12/1952 | Hoekstra | |
| 2,892,858 A | 6/1959 | Ziegler | |
| 3,647,680 A | 3/1972 | Greenwood et al. | |
| 3,652,231 A | 3/1972 | Greenwood et al. | |
| 3,692,496 A | 9/1972 | Greenwood et al. | |
| 3,852,190 A | 12/1974 | Buss et al. | |
| 3,915,845 A | 10/1975 | Antos | |
| 4,012,313 A | 3/1977 | Buss et al. | |
| 4,499,205 A | 2/1985 | Masuda | |
| 4,501,823 A | 2/1985 | Masuda | |
| 4,677,094 A | 6/1987 | Moser et al. | |
| 4,714,694 A | 12/1987 | Wan et al. | |
| 4,832,921 A | 5/1989 | Greenwood | |
| 5,665,223 A | 9/1997 | Bogdan | |
| 5,883,032 A | 3/1999 | Bogdan et al. | |
| 6,007,700 A | 12/1999 | Alario et al. | |
| 6,013,173 A | 1/2000 | Bogdan | |
| 6,059,960 A | 5/2000 | Bogdan | |
| 6,239,063 B1 | 5/2001 | Bogdan | |
| 6,419,820 B1 | 7/2002 | Bogdan et al. | |
| 6,780,814 B2 | 8/2004 | Ma et al. | |
| 6,790,432 B2 | 9/2004 | Ruettinger et al. | |
| 6,809,061 B2 | 10/2004 | Bogdan et al. | |
| 7,166,268 B2 | 1/2007 | Fukunaga | |
| 2002/0155946 A1 * | 10/2002 | Bogdan et al. ................. | 502/227 |
| 2005/0208350 A1 | 9/2005 | Isozaki et al. | |
| 2007/0060469 A1 | 3/2007 | Bogdan et al. | |
| 2007/0060470 A1 | 3/2007 | Bogdan et al. | |
| 2007/0060779 A1 | 3/2007 | Bogdan et al. | |
| 2007/0270624 A1 | 11/2007 | Bogdan et al. | |
| 2010/0139251 A1 | 6/2010 | Perry et al. | |

OTHER PUBLICATIONS

Lapinski et al., "Right on Target", Hydrocarbon Engineering, Nov. 2010, vol. 15, No. 11, pp. 48-52.

Navarro et al., "Hydrogen Production by Oxidative Reforming of Hexadecane Over Ni and Pt Catalysts Supported on Ce/La-doped Al2O3", Applied Catalysis A: General, Jan. 4, 2006, vol. 297, No. 1, pp. 60-72.

* cited by examiner

*Primary Examiner* — Walter D Griffin
*Assistant Examiner* — Derek Mueller
(74) *Attorney, Agent, or Firm* — Maryann Maas

(57) ABSTRACT

One exemplary embodiment can be a catalyst for catalytic reforming of naphtha. The catalyst can have a noble metal including one or more of platinum, palladium, rhodium, ruthenium, osmium, and iridium, a lanthanide-series metal including one or more elements of atomic numbers 57-71 of the periodic table, and a support. Generally, an average bulk density of the catalyst is about 0.300-about 0.620 gram per cubic centimeter, and an atomic ratio of the lanthanide-series metal:noble metal is less than about 1.3:1. Moreover, the lanthanide-series metal can be distributed at a concentration of the lanthanide-series metal in a 100 micron surface layer of the catalyst less than about two times a concentration of the lanthanide-series metal at a central core of the catalyst.

20 Claims, 2 Drawing Sheets

REFORMING CATALYST AND PROCESS

FIELD OF THE INVENTION

This invention generally relates to a reforming catalyst and process.

DESCRIPTION OF THE RELATED ART

Some catalysts may have both a hydrogenation-dehydrogenation function and a cracking function and are useful for accelerating a wide spectrum of hydrocarbon-conversion reactions. Different components, such as the carrier, may contribute to the cracking function while other portions, such as deposited metals, may contribute to the hydrogenation-dehydrogenation function. Some components contribute to both the cracking and hydrogenation-dehydrogenation functions. Typically, dual function catalysts are used to accelerate a variety of hydrocarbon conversion reactions, such as dehydrogenation, hydrogenation, hydrocracking, hydrogenolysis, isomerization, desulfurization, cyclization, alkylation, polymerization, cracking, and hydroisomerization.

Generally, it is desirable to have flexibility with catalyst functionality for utilizing in various processes, such as reforming. In one exemplary reforming process, increasing the yield of one or more $C5^+$ hydrocarbons, hydrogen, and aromatic yields is desired. Optionally, the acidity of the catalyst can be altered by adding a metal and/or other elements to the catalyst. Generally, modification of the acid function results in reduced cracking of the alkanes to C3 and C4 light ends allowing increased selectivity to the formation of aromatics. Modification of the metal function may also occur resulting in the reduction of alkane cracking to methane and ethane. There can also be a reduction in the dealkylation reactions of aromatics leaving heavier and more valuable $C8^+$ aromatics.

Beside the yields, the activity of a catalyst may enable obtaining a commercially useful conversion level without employing additional quantities of catalyst or using excessively high temperatures, which can lead to undesired higher costs. Higher catalyst activity can also be utilized to process greater quantities of feed or to increase conversion, and therefore increase the production of valuable products.

SUMMARY OF THE INVENTION

One exemplary embodiment can be a catalyst for catalytic reforming of naphtha. The catalyst can have a noble metal including one or more of platinum, palladium, rhodium, ruthenium, osmium, and iridium, a lanthanide-series metal including one or more elements of atomic numbers 57-71 of the periodic table, and a support. Generally, an average bulk density of the catalyst is about 0.300-about 0.620 gram per cubic centimeter, and an atomic ratio of the lanthanide-series metal:noble metal is less than about 1.3:1. Moreover, the lanthanide-series metal can be distributed at a concentration of the lanthanide-series metal in a 100 micron surface layer of the catalyst less than about two times a concentration of the lanthanide-series metal at a central core of the catalyst.

Another exemplary embodiment can be a catalyst for catalytic reforming of naphtha. The catalyst can include platinum, cerium, chloride, and a support. Additionally, an average bulk density of the catalyst is about 0.300-about 0.620 gram per cubic centimeter, an atomic ratio of cerium:platinum is less than about 1.3:1, and an atomic ratio of chloride:cerium is about 14:1-about 20:1.

A further exemplary embodiment can be a reforming process. The reforming process can include charging a hydrocarbon feedstock and a hydrogen-rich gas to a reforming zone, and contacting the hydrocarbon feedstock and the hydrogen rich gas in a reactor in the reforming zone. Usually, the catalyst includes a noble metal including one or more of platinum, palladium, rhodium, ruthenium, osmium, and iridium, a lanthanide-series metal including one or more elements of atomic numbers 57-71 of the periodic table, and a support. Generally, an average bulk density of the catalyst is about 0.300-about 0.620 gram per cubic centimeter, and an atomic ratio of the lanthanide-series metal:noble metal is less than about 1.3:1. Moreover, the lanthanide-series metal can be distributed at a concentration of the lanthanide-series metal in a 100 micron surface layer of the catalyst less than about two times a concentration of the lanthanide-series metal at a central core of the catalyst.

In one exemplary embodiment, a lanthanide-series metal of the periodic table is added to a low density spherical alumina carrier that obtains high yields of one or more $C5^+$ hydrocarbons without large activity debits. Specifically, an atomic ratio of the lanthanide-series metal:noble metal as well as metal concentration distribution are defined that provides yield and activity benefits.

Definitions

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a superscript "+" or "−" may be used with an abbreviated one or more hydrocarbons notation, e.g., $C3^+$ or $C3^-$, which is inclusive of the abbreviated one or more hydrocarbons. As an example, the abbreviation "$C3^+$" means one or more hydrocarbon molecules of three and/or more carbon atoms.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of at least generally about 50%, and preferably about 70%, by mole, of a compound or class of compounds in a stream.

As used herein, the term "substantially" can mean an amount of at least generally about 80%, preferably about 90%, and optimally about 99%, by mole, of a compound or class of compounds in a stream.

As used herein, the term "uniform in composition" can mean that an unlayered support has no concentration gradients of the species inherent to its composition, and is substantially homogeneous in composition. If the support is a mixture of two or more refractory materials, the relative amounts of these materials may be constant and uniform throughout the entire support.

As used herein, the term "surface layer" means the layer of a catalyst particle adjacent to the surface of the particle. Often, a concentration of surface-layer metal tapers off from the surface to the center of the catalyst particle.

As used herein, the term "layer" is a stratum of a catalyst particle of substantially uniform thickness at a substantially uniform distance from the surface of the catalyst particle.

As used herein, the term "central core" is a core of a catalyst particle representing 50% of the diameter of the catalyst particle.

As used herein, the term "diameter" is defined as the minimum regular dimension through the center of a catalyst particle, e.g., this dimension would be the diameter of the cylinder of an extrudate.

As used herein, the term "halide" can mean an ion, such as the chlorine, that picks up one electron to form an anion, e.g., chloride.

As used herein, the term "loss on ignition" may be abbreviated "LOI".

As used herein, the term "average bulk density" may be abbreviated "ABD".

As used herein, the term "research octane number" may be abbreviated "RON".

As used herein, the term "weight percent" may be abbreviated "wt. %".

As used herein, the term "meter-squared per gram" may be abbreviated "$m^2/g$".

As used herein, the term "millimeter" may be abbreviated "mm".

As used herein, the term "gram per cubic centimeter" may be abbreviated "g/cc" or "$g/cm^3$".

As used herein, the term "atomic ratio" may be used interchangeably with "mole ratio".

As used herein, the terms "alkane" and "paraffin" may be used interchangeably.

As used herein, the terms "alkene" and "olefin" may be used interchangeably.

As used herein, the terms "cycloalkane" and "naphthene" may be used interchangeably.

DETAILED DESCRIPTION

Figure 1:
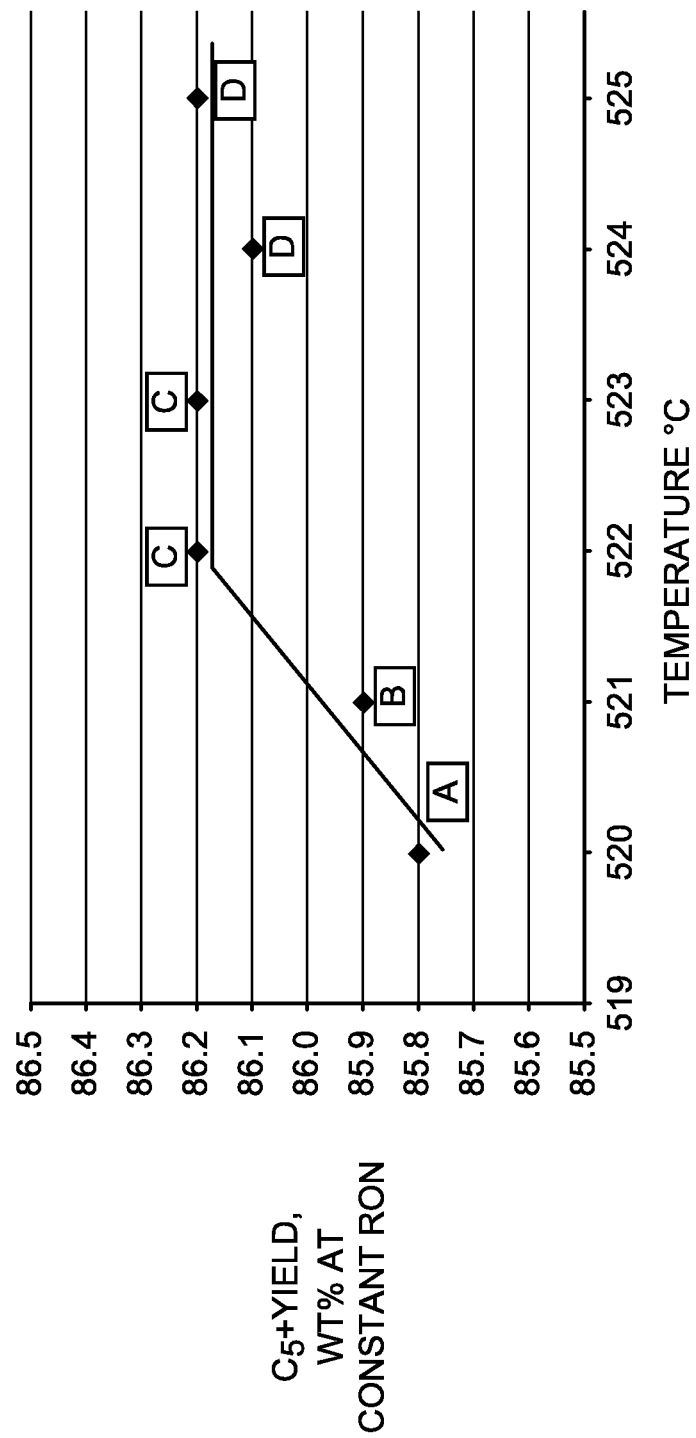
FIG. 1 is a graphical depiction of several samples comparing $C5^+$ yield in weight percent at constant RON versus temperature in Celsius.

The embodiments disclosed herein can provide a catalyst suitable for reforming including a support having one or more metals incorporated or deposited thereon. The catalyst can be characterized by specified ratios of components. Generally, the metals include a noble metal, a group 14 metal of the periodic table, and a lanthanide series metal of atomic numbers 57-71 of the periodic table. Typically, the catalyst is prepared by adding a lanthanide metal with a metal of groups 8-10 of the periodic table, typically platinum, in a hydrochloric acid solution and impregnating the alumina support in single or multiple steps. Next, the catalyst may be finished with oxychlorination and reduction treatments. Some of the materials and methods of preparing the catalyst is disclosed in, e.g., U.S. Pat. No. 6,809,061.

Usually, the support is a porous, adsorptive, high-surface area support having a surface area of about 25-about 500 $m^2/g$. The porous support material should also be uniform in composition and relatively refractory to the conditions utilized in the hydrocarbon conversion process. Thus, support materials can include one or more of (1) a refractory inorganic oxide such as an alumina, a magnesia, a titania, a zirconia, a chromia, a zinc oxide, a thoria, a boria, a silica-alumina, a silica-magnesia, a chromia-alumina, an alumina-boria, and a silica-zirconia; (2) a ceramic, a porcelain, and a bauxite; (3) a silica, a silica gel, a silicon carbide, a clay and a synthetically prepared or naturally occurring optionally acid-treated silicate; (4) a crystalline zeolitic aluminosilicate, such as an X-zeolite, a Y-zeolite, a mordenite, and an L-zeolite, either in hydrogen form or preferably in nonacidic form with one or more alkali metals occupying the cationic exchangeable sites; and (5) a non-zeolitic molecular sieve, such as an aluminophosphate or a silico-alumino-phosphate.

Preferably, the support includes one or more inorganic oxides, with the preferred inorganic oxide being alumina. A suitable alumina material may include a crystalline alumina known as the gamma-, eta-, and theta-alumina, with gamma- or eta-alumina being the most preferred. The preferred refractory inorganic oxide can have an apparent bulk density of generally about 0.300-about 0.620 $g/cm^3$, preferably about 0.550-about 0.580 $g/cm^3$, and optimally about 0.555-about 0.580 $g/cm^3$. The surface area characteristics may include an average pore diameter of about 20-about 300 angstroms, a pore volume of about 0.1-about 1 $cm^3/g$, and a surface area of about 100-about 500 $m^2/g$.

One exemplary alumina is disclosed in, e.g., U.S. Pat. Nos. 3,852,190 and 4,012,313 as a by-product from a Ziegler higher alcohol synthesis reaction as described in, e.g., U.S. Pat. No. 2,892,858, hereinafter referred to as a "Ziegler alumina". A high-purity pseudoboehmite, after calcination at a high temperature, can provide a gamma-alumina of high-purity.

The alumina powder can be formed into particles of any desired shape, such as spheres, rods, pills, pellets, tablets, granules, and extrudates. Typically, such particles have at least one regular dimension, usually a circular cross-section and referred to herein as a "diameter," of about 0.7-about 3.5 mm.

Usually, the catalyst support is a spherical particle, with a preferred diameter of about 0.7-about 3.5 mm. Generally, an alumina sphere is continuously manufactured by an oil-drop method. Typically, the oil-drop includes forming an alumina hydrosol and reacting aluminum metal with hydrochloric acid, combining the resulting hydrosol with a suitable gelling agent, and dropping the resultant mixture into an oil bath maintained at elevated temperatures. The droplets of the mixture can remain in the oil bath until they set and form hydrogel spheres. The spheres may then be continuously withdrawn from the oil bath and typically subjected to specific aging treatments in oil and an ammoniacal solution to further improve their physical characteristics. The resulting gelled and aged particles may then be washed and dried at a temperature of about 205-about 1,500° C. and be subjected to a calcination at a temperature of about 450-about 700° C. for a period of about 1-about 20 hours. This treatment effects conversion of the alumina hydrogel to the corresponding crystalline gamma-alumina, and is disclosed in, e.g., U.S. Pat. No. 2,620,314.

Alternatively, the support may be a cylindrical extrudate, preferably prepared by mixing an alumina powder with water and suitable peptizing agents, such as hydrochloric or nitric acids, until an extrudable dough is formed. The amount of water added to form the dough is typically sufficient to give an LOI of about 500° C., of about 45-about 65%, by weight, with a value of about 55%, by weight, being preferred. Generally, the acid addition rate is sufficient to provide about 2-about 7%, by weight, of the volatile-free alumina powder used in the mix, with a value of about 3-about 4%, by weight, being preferred. The resulting dough can be extruded through a suitably sized die to form extrudate particles. These particles may then be dried at a temperature of about 260-about 427° C. for a period of about 0.1-about 5 hours to form the extrudate particles. Generally, the diameter of cylindrical extrudate particles can be about 0.7-about 3.5 mm, preferably with a length-to-diameter ratio of about 1:1-about 5:1.

Generally, a noble metal is incorporated in the catalyst. The noble metal may include one or more of platinum, palladium, ruthenium, rhodium, iridium, and osmium, with platinum being preferred. The noble metal may exist within the final catalyst as a compound such as an oxide, a sulfide, a halide, or an oxyhalide, in chemical combination with one or more of the other ingredients of the composite or as an elemental metal. In one exemplary embodiment, the noble metal is present in an elemental state and is homogeneously dispersed within the carrier material. Alternatively, the noble metal is coprecipitated with the lanthanum-series metal to form a gradient in the catalyst. This component may be present in the final catalyst composite in any catalytically effective amount, such as about 0.01-about 2 wt. %, of the final catalyst, calculated on an elemental basis based on the weight of the catalyst. Excellent results may be obtained with about 0.05-about 1 wt. % of platinum based on the weight of the catalyst.

The noble metal may be incorporated in the porous carrier material in any suitable manner, such as coprecipitation, ion-exchange or impregnation. One preferred method of preparing the catalyst can be impregnating the carrier material in a relatively uniform manner with a soluble, decomposable compound of noble metal. As an example, the component may be added to the support by commingling the latter with an aqueous solution of chloroplatinic, chloroiridic or chloropalladic acid. Other water-soluble compounds or complexes of noble metals may be employed in impregnating solutions and include one or more of an ammonium chloroplatinate, a bromoplatinic acid, a platinum trichloride, a platinum tetrachloride hydrate, a platinum dichlorocarbonyl dichloride, a dinitrodiaminoplatinum, a sodium tetranitroplatinate (II), a palladium chloride, a palladium nitrate, a palladium sulfate, a diamminepalladium (II) hydroxide, a tetramminepalladium (II) chloride, a hexamminerhodium chloride, a rhodium carbonylchloride, a rhodium trichloride hydrate, a rhodium nitrate, a sodium hexachlororhodate (III), a sodium hexanitrorrhodate (III), an iridium tribromide, an iridium dichloride, an iridium tetrachloride, a sodium hexanitroiridate (III), a potassium or sodium chloroiridate, and potassium rhodium oxalate. The utilization of a platinum, iridium, rhodium, or palladium chloride compound, such as chloroplatinic, chloroiridic or chloropalladic acid or rhodium trichloride hydrate, is generally preferred. Generally, hydrogen chloride or other similar acid may also be added to the impregnation solution to further facilitate the incorporation of the halide component and the uniform distribution of the metallic components throughout the carrier material. Furthermore, it is generally preferred to impregnate the carrier material after it has been calcined in order to minimize the risk of washing away the noble metal.

Generally the noble metal is dispersed homogeneously in the catalyst. Preferably, dispersion of the noble metal is determined by Scanning Transmission Electron Microscope (herein may be abbreviated "STEM"), by comparing metal concentrations with an overall catalyst metal content. Alternatively, one or more noble metals may be present as a surface-layer component as described in, e.g., U.S. Pat. No. 4,677,094.

A group 14 metal of the periodic table may also be included. Desirably, the group 14 metal is germanium or tin, and tin is particularly preferred. The group 14 metal may be present as an elemental metal, such as an oxide, a sulfide, a halide, or an oxychloride, or as a physical or chemical combination with the porous carrier material and/or other components of the catalyst. Preferably, a substantial portion of the group 14 metal exists in the finished catalyst in an oxidation state above that of the elemental metal. The group 14 metal, preferably tin, optimally is utilized in an amount sufficient to result in a final catalyst containing no more than about 5 wt. %, desirably about 0.01-about 5 wt. %, calculated on an elemental basis based on the weight of the catalyst. Desirably, about 0.1-about 2 wt. % of the group 14 metal calculated on an elemental basis based on the weight of the catalyst is included.

The group 14 metal may be incorporated in the catalyst in any suitable manner to achieve a homogeneous dispersion, such as by coprecipitation with the porous carrier material, ion-exchange with the carrier material, or impregnation of the carrier material at any stage in the preparation. One method of incorporating the group 14 metal into the catalyst composite may involve the utilization of a soluble, decomposable compound of a group 14 metal to impregnate and disperse the metal throughout the porous carrier material. The group 14 metal can be impregnated either prior to, simultaneously with, or after the other components are added to the carrier material. Thus, the group 14 metal may be added to the carrier material by commingling the latter with an aqueous solution of a suitable metal salt or soluble compound, such as a stannous bromide, a stannous chloride, a stannic chloride, a stannic chloride pentahydrate, a germanium oxide, a germanium tetraethoxide, a germanium tetrachloride, a lead nitrate, a lead acetate, and a lead chlorate. The utilization of group 14 metal chloride compounds, such as a stannic chloride, a germanium tetrachloride, or a lead chlorate is particularly preferred. When combined with hydrogen chloride during the especially preferred alumina peptization step described hereinabove, a homogeneous dispersion of the group 14 metal may be obtained. Alternatively, one or more organic metal compounds such as a trimethyltin chloride and a dimethyltin dichloride are incorporated into the catalyst during the peptization of the inorganic oxide binder, and most preferably during peptization of an alumina with a hydrogen chloride or a nitric acid.

A lanthanide-series metal of atomic numbers 57-71 of the periodic table may also be included. The lanthanide-series metal may include lanthanum, cerium, praseodymium, neodymium, promethium, samarium, europium, gadolinium, terbium, dysprosium, holmium, erbium, thulium, ytterbium and lutetium with cerium being preferred. The lanthanide-series metal may be present in any catalytically available form, such as an elemental metal, a compound such as an oxide, a hydroxide, a halide, an oxyhalide, an aluminate, or in chemical combination with one or more of the other ingredients of the catalyst. The lanthanide-series metal may be present in an oxidation state above that of the elemental metal, such as an oxide, an oxyhalide, a halide, or a mixture thereof. Preferably, oxidation and reduction stages are used in the preparation as hereinafter described.

The lanthanide-series metal may be concentrated in the surface layer of each catalyst particle. The surface-layer concentration is the average of measurements within a surface layer which is about 100 microns deep from an exterior surface. The concentration of surface-layer lanthanide-group metal tapers off from the surface to the center of the catalyst particle, which can be in a gradual or more abrupt fashion. For the preferred spherical particles of the embodiments disclosed herein, the central core may be a spherical portion in the center of the particle having a diameter of about 50% of that of the spherical particle. The surface-layer component is measured as the concentration in the layer which extends 100 microns from the surface of the particle and the central core represents 50% of the diameter of the particle.

As an example, a spherical catalyst with a radius of 0.08 centimeter can have a surface layer of 100 micron or 0.01 centimeter deep, a pill density of 0.92 g/cm³, and 1%, by weight, of cerium. The volume of the entire catalyst can be calculated as:

$$\text{Volume of entire catalyst pill} = 4/3 * \pi * (r)^3$$

where r is the radius of the catalyst.

The volume of the catalyst can be calculated $[4/3*\pi*(0.08)^3]$ as $0.002145$ cm³ and the volume of the catalyst absent the surface layer (or central core) can be calculated $[4/3*\pi*(0.07)^3]$ as $0.001437$ cm³. The difference of these two volumes can yield the volume of the surface layer, namely $0.000708$ cm³.

The weight of the entire catalyst, central core, and surface layer can be calculated by multiplying the volume times density, and are depicted as follows:

TABLE 1

|  | Volume (cm³) | Pill Density (g/cm³) | Catalyst Weight(g) |
| --- | --- | --- | --- |
| Entire Catalyst | 0.002145 | 0.92 | 0.001973 |
| Central Core | 0.001437 | 0.92 | 0.001322 |
| Surface Layer | 0.000708 | 0.92 | 0.000651 |

A catalyst with 1%, by weight, cerium can have 0.01973 milligram of cerium by multiplying the weight fraction of cerium times the catalyst weight. If the catalyst has 50%, by weight, of cerium contained in the surface layer, 0.009865 milligram of cerium can be contained in the surface layer and 0.009865 milligram can be contained in the central core. The concentration in wt. % can be calculated by dividing the cerium weight (in grams) in a given volume by the corresponding catalyst weight (in grams) in that volume to yield a central core concentration of 0.75 wt. % and a surface layer concentration of 1.52 wt. %. Thus, the surface layer in this example demonstrates cerium concentration about two times the central core.

Preferably, the metal gradient is determined by Scanning Electron Microscopy (herein may be abbreviated "SEM"). SEM determinations of local metal concentrations are effected on at least three sample particles from a bed of catalyst particles. Samples are randomly selected from the bed by techniques known to those of ordinary skill in the art. Generally, the SEM determines the approximate metals content at a series of depths within a catalyst particle, based on the metals distribution profile in relation to the quantity of support. The metal concentration can be determined at a particular point or by the average of concentrations in a concentric slice at a defined depth from the surface of the catalyst pill. The concentration of the 100 micron surface layer is calculated by taking the average of a series of metal concentrations taken at increasing depths up to 100 microns in the surface layer of at least three catalyst pills, preferably of at least six pills; and more preferably of at least 12 pills.

Preferably, the surface-layer lanthanide-series metal has a concentration on an elemental basis as measured by SEM in the surface layer of particles of the catalyst, which is less than about twice the concentration of the lanthanide-series metal in the central core of the particles. More preferably, the metal concentration ratio in the surface layer to the central core is about 1:1-less than about 2:1. In an alternative definition, less than about 50% of a surface-layer metal is contained in the surface layer of a catalyst.

The surface-layer lanthanide may be incorporated into the catalyst particle in any manner suitable to affect a decreasing gradient of the metal from the surface to the center of the particle. One example of this would be by spray impregnation. A spray nozzle may be located within a rotating drum that holds a catalyst support, and a solution of the salt of the surface-layer metal is ejected from the nozzle using air to form fine droplets of spray that contact the support in the rotating drum for effective mixing. Suitable salts may include the nitrates, sulfates, acetates, chlorides, bromides, iodides, amine complexes, and organometallics, such as the alkyl and alkoxide compounds. The volume ratio of solution to support is sufficient to effect the desired concentration of surface-layer metal in the catalyst and can be from about 0.1-about 1.0 wt. %.

Alternatively, a metal is impregnated as a compound, especially a salt, which decomposes at a pH of about 5 or more. As an example, the preferred metal is impregnated as a chloride salt that decomposes upon contact. Alternatively, a compound of the metal that complexes other components or does not penetrate into the interior of the particle may be utilized. An example is a multi-dentated ligand, such as carboxylic acids or metal compounds containing amino groups, thiol groups, phosphorus groups or other polar groups that can bond strongly to an oxide support.

The lanthanide-metal is incorporated into the catalyst in any catalytically effective amount obtained with about 0.05-about 5 wt. % lanthanide on an elemental basis in the catalyst based on the weight of the catalyst. Preferably, about 0.2-about 2 wt. % lanthanide, calculated on an elemental basis, may be used based on the weight of the catalyst. The preferred atomic ratio of lanthanide, preferably cerium, to noble metal, preferably platinum, is about 0.45:1.00-about 1.29:1.00, about 0.50:1.00-about 1.29:1.00, about 0.94:1.00-about 1.29:1.00, about 0.94:1.00-about 1.26:1.00, and about 1.00:1.00-about 1.26:1.00.

Optionally, the catalyst may also contain other components or mixtures thereof that act alone or in concert as catalyst modifiers to improve activity, selectivity or stability. Some known catalyst modifiers include rhenium, cobalt, nickel, iron, tungsten, molybdenum, chromium, bismuth, antimony, zinc, cadmium and copper. Catalytically effective amounts of these components may be added in any suitable manner to the carrier material during or after its preparation or to the catalyst before, during, or after other components are being incorporated.

Preferably, however, a metal component of the catalyst consists essentially of a noble metal, a group 14 metal and a lanthanide-series metal, and more preferably of platinum, tin and cerium. The atomic ratio of lanthanide-series metal, preferably cerium, to noble metal, preferably platinum, is about 0.50:1.00-about 1.29:1.00, about 0.94:1.00-about 1.29:1.00, or about 0.94:1.00-about 1.26:1.00.

An optional component of the catalyst, useful in hydrocarbon conversion embodiments including dehydrogenation, dehydrocyclization, or hydrogenation reactions, is an alkali or alkaline-earth metal. More precisely, this optional ingredient is selected from alkali metals—cesium, rubidium, potassium, sodium, and lithium—and the compounds of the alkaline-earth metals—calcium, strontium, barium, and magnesium. Generally, good results are obtained in these embodiments when this component constitutes about 0.01-about 5 wt. % of the composite, calculated on an elemental basis based on the weight of the catalysis. This optional alkali or alkaline-earth metal can be incorporated into the composite in any of the known ways with impregnation of an aqueous solution of a suitable water-soluble, decomposable compound being preferred. The catalyst can have an average bulk density of about 0.300-about 0.620 g/cm$^3$, preferably about 0.550-about 0.580 g/cm$^3$, or optimally about 0.555-about 0.580 g/cm$^3$.

Generally, at least one oxidation step is employed in the preparation of the catalyst. The oxidation step typically takes place at a temperature of about 370-about 650° C. Typically, an oxygen atmosphere is employed including air. Generally, the oxidation step is carried out for a period of from about 0.5-about 10 hours or more. Typically, the exact period of time is whatever required to convert substantially all of the metallic components to their corresponding oxide form. This time will, of course, vary with the oxidation temperature employed and the oxygen content of the atmosphere employed.

In addition to the oxidation step, a halide adjustment step may also be employed in preparing the catalyst. The halide adjustment step may serve a dual function. First, the halide adjustment step may aid in homogeneous dispersion of the noble metal and other metals. Additionally, the halide adjustment step can serve as a means of incorporating the desired level of halide into the final catalyst. Usually, the halide adjustment step employs a halogen or halide-containing compound in air or an oxygen atmosphere. Because the preferred halide for incorporation into the catalyst can include chloride, the preferred halogen or halide-containing compound utilized during the halide adjustment step is chlorine, hydrogen chloride or the precursor of these compounds.

In carrying out the halide adjustment step, the catalyst is contacted with the halogen or halide-containing compound in air or an oxygen atmosphere at an elevated temperature of about 370-about 650° C. It is further desired to have water present during the contacting step in order to aid in the adjustment. In particular, when the halide component of the catalyst may include chloride, it is preferred to use a mole ratio of water to hydrogen chloride of about 5:1-about 100:1. The duration of the halogenation step is typically from about 0.5-about 5 hours or more. Because of the similarity of conditions, the halide adjustment step may take place during the oxidation step. Alternatively, the halide adjustment step may be performed before or after the oxidation step as required by the particular method being employed to prepare the catalyst. Irrespective of the exact halide adjustment step employed, the halide content of the final catalyst should be such that there is sufficient halide to include, on an elemental basis, from about 0.1-about 10 wt. % based on the weight of the catalyst. Generally, an atomic ratio of halide:lanthanide-series metal, preferably chloride:cerium, is about 14:1-about 20:1.

A reduction step is desired for preparing the catalyst. The reduction step can reduce substantially all of the noble metal to the corresponding elemental metallic state and to ensure a relatively uniform and finely divided dispersion of this component throughout the refractory inorganic oxide. Preferably, the reduction step takes place in a substantially water-free environment. Generally, the reducing gas is substantially pure, dry hydrogen, i.e., less than about 20 volume ppm water. However, other reducing gases may be employed such as carbon monoxide, nitrogen, or hydrogen containing light hydrocarbons. Typically, the reducing gas is contacted with the oxidized catalytic composite at conditions including a reduction temperature of about 315-about 650° C. for a period of time of about 0.5-about 10 or more hours effective to reduce substantially all of the noble metal to the elemental metallic state. The reduction step may be performed prior to loading the catalytic composite into a hydrocarbon conversion zone or it may be performed in situ as part of a hydrocarbon conversion process start-up procedure. However, if this latter technique is employed, proper precautions must be taken to predry the conversion unit to a substantially water-free state, and a substantially water-free reducing gas should be employed. Optionally, the catalytic composite may be subjected to a presulfiding step. The optional sulfur component may be incorporated into the catalyst by any known technique.

In one exemplary embodiment, the catalyst may have a particular utility as a hydrocarbon conversion catalyst. Generally, the hydrocarbon, which is to be converted, is contacted with the catalyst at hydrocarbon-conversion conditions, including a temperature of about 40-about 600° C., a pressure of about 100-about 21,000 kPa, and a liquid hourly space velocity of about 0.1-about 100 hr$^{-1}$. The catalyst is particularly suitable for catalytic reforming of gasoline-range feedstocks, and also may be used for, inter alia, dehydrocyclization, isomerization of aliphatics and aromatics, dehydrogenation, hydro-cracking, disproportionation, dealkylation, alkylation, transalkylation, and oligomerization.

Generally, the reforming process is effected at conditions including a pressure selected within the range of about 100-about 7,000 kPa, preferably about 350-2,500 kPa. The reforming temperature is about 315-about 600° C., preferably about 425-about 565° C. Typically, the initial selection of the temperature within this broad range is made primarily as a function of the desired octane of the product reformate considering the characteristics of the charge stock and of the catalyst. Ordinarily, the temperature thereafter is then slowly increased during the run to compensate for the inevitable deactivation that occurs to provide a constant octane product. Sufficient hydrogen is supplied to provide an amount of about 1-about 20, preferably about 2-about 10, moles of hydrogen per mole of hydrocarbon feed entering the reforming zone. Likewise, the liquid hourly space velocity is about 0.1-about 20 hr$^{-1}$, preferably about 1-about 5 hr$^{-1}$.

Preferably, the hydrocarbon feedstock is a naphtha feedstock including naphthenes and paraffins that boil within the gasoline range. The preferred feedstocks are naphthas consisting principally of naphthenes and paraffins, although, in many cases, aromatics will also be present. This preferred class includes straight-run gasolines, natural gasolines, and synthetic gasolines. Alternatively, it is frequently advantageous to charge thermally or catalytically cracked gasolines, partially reformed naphthas, or dehydrogenated naphthas. Mixtures of straight-run and cracked gasoline-range naphthas can also be used. The gasoline-range naphtha charge stock may be a full-boiling gasoline having an initial ASTM D-86 boiling point of from about 40-about 80° C., and an end boiling point within the range of from about 160-about 220° C., or may be a selected fraction thereof that generally has a higher-boiling fraction commonly referred to as a heavy naphtha. As an example, a naphtha boiling in the range of about 100-about 200° C. may be considered a heavy naphtha. If the reforming is directed to production of one or more of benzene, toluene and xylenes, the boiling range may be about 60-about 150° C. In some cases, it is also advantageous to process pure hydrocarbons or mixtures of hydrocarbons that have been recovered from extraction units. As an example, raffinates from aromatics extraction or straight-chain paraffins are to be converted to aromatics.

Desirably, the catalyst is utilized in a substantially water-free environment. Typically, the water level present in the feedstock and the hydrogen stream, which is being charged to the reforming zone, is controlled. Best results may be obtained when the total amount of water entering the conversion zone from any source is held to a level less than about 50 ppm, preferably less than about 20 ppm, expressed as weight of equivalent water in the feedstock. Generally, this can be accomplished by careful control of the water present in the feedstock and in the hydrogen stream. The feedstock can be dried by using any suitable drying means. As an example, the water content of the feedstock may be adjusted by suitable stripping operations in a fractionation column. Alternatively or additionally, water may be removed using a conventional solid adsorbent having a high selectivity for water such as: a sodium or calcium crystalline aluminosilicate, a silica gel, an activated alumina, a molecular sieve, an anhydrous calcium sulfate, and a high surface area sodium. In some cases, a combination of adsorbent drying and distillation drying may be used advantageously to effect almost complete removal of water from the feedstock. Usually, the water content of the hydrogen stream entering the hydrocarbon conversion zone is maintained at about 10-about 20 volume ppm or less based on the volume of the hydrogen stream.

Generally, the catalyst is operated in a substantially sulfur-free environment. Any suitable control means may be used to treat the naphtha feedstock, which is to be charged to the reforming reaction zone. As an example, the feedstock may be subjected to adsorption processes, catalytic processes, or combinations thereof. An adsorption process may employ a molecular sieve, a high surface area silica-alumina, a carbon molecular sieve, a crystalline aluminosilicate, an activated carbon, and a high surface area metallic containing a composition, such as nickel or copper. Usually, these feedstocks are treated by conventional catalytic pretreatment methods such as hydrorefining, hydrotreating, and hydrodesulfurization to remove substantially all sulfurous, nitrogenous and water-yielding contaminants therefrom, and to saturate any olefins that may be contained therein. Catalytic processes may employ traditional sulfur reducing catalysts known to the art including refractory inorganic oxide supports containing metals from groups 6, 8-10, and 12 of the periodic table.

Typically, the hydrocarbon feedstock and a hydrogen-rich gas are preheated and charged to a reforming zone containing typically two to five reactors in series. Suitable heating means are provided between reactors to compensate for the net endothermic heat of reaction in each of the reactors. Reactants may contact the catalyst in individual reactors in either upflow, downflow, or radial flow fashion, with the radial flow mode being preferred. The catalyst may be contained in a fixed-bed system or, preferably, in a moving-bed system with associated continuous catalyst regeneration. Alternative approaches to reactivation of deactivated catalyst include semiregenerative operation, which includes shutting down the entire unit for catalyst regeneration and reactivation, or swing-reactor operation, which includes isolating a single reactor from the system, regenerating and reactivating while the other reactors remain onstream. Typically, continuous catalyst regeneration in conjunction with a moving-bed system is disclosed, inter alia, in, e.g., U.S. Pat. Nos. 3,647,680; 3,652,231; 3,692,496; and 4,832,921.

Generally, effluent from the reforming zone is passed through a cooling means to a separation zone, often maintained at about 0-about 65° C., where a hydrogen-rich gas is separated from a liquid stream commonly called "unstabilized reformate". The resultant hydrogen stream can then be recycled through suitable compressing means back to the reforming zone. Usually, the liquid phase from the separation zone is withdrawn and processed in a fractionating system in order to adjust the butane concentration, thereby controlling front-end volatility of the resulting reformate.

Illustrative Embodiments

The following examples are intended to further illustrate the subject catalyst. These illustrations of embodiments of the invention are not meant to limit the claims of this invention to the particular details of these examples. These examples are based on engineering calculations and actual operating experience with similar processes.

EXAMPLE 1

Spherical catalysts including platinum, tin and cerium (or lanthanum) on alumina are prepared. Tin is incorporated into an alumina sol, and the tin-containing alumina sol is oil-dropped to form 1.6 mm spheres that are steamed to dryness at about 10% LOI and calcined at 650° C. Next, the spherical support is co-impregnated with a solution of cerium chloride (or lanthanum chloride) and chloroplatinic acid and calcined at 350° C. for 2 hours, dried and oxychlorinated at 510° C. followed by reduction with pure hydrogen at 565° C. The compositions and properties of the samples are depicted below:

TABLE 2

| Catalyst | Pt (wt. %) | Sn (wt. %) | Ce (wt. %) | Cl (wt. %) | ABD (g/cm³) | Ce/Pt (atomic ratio) |
|---|---|---|---|---|---|---|
| A | 0.300 | 0.32 | 0.00 | 0.97 | 0.558 | 0.00 |
| B | 0.300 | 0.31 | 0.10 | 0.95 | 0.559 | 0.46 |
| C | 0.300 | 0.31 | 0.20 | 0.97 | 0.562 | 0.94 |
| D | 0.290 | 0.30 | 0.29 | 1.05 | 0.558 | 1.39 |
| F | 0.290 | 0.31 | 0.31 | 1.01 | 0.564 | 1.47 |
| G | 0.300 | 0.31 | 0.41 | 1.07 | 0.561 | 1.92 |
| H | 0.300 | 0.31 | 0.59 | 0.97 | 0.557 | 2.78 |

TABLE 3

| Catalyst | Pt (wt. %) | Sn (wt. %) | La (wt. %) | Cl (wt. %) | ABD (g/cm³) | La/Pt (atomic ratio) |
|---|---|---|---|---|---|---|
| I | 0.29 | 0.30 | 0.38 | 1.04 | 0.565 | 1.84 |

These catalyst samples are pilot plant tested in a reforming pilot plant in an accelerated stability mode by raising the temperature to hold a constant RON of either 103.2 or 104.7 as determined by gas chromatograph at 620 kPa, a hydrogen:hydrocarbon mole ratio of 2, a liquid hourly space velocity 1.7 hour$^{-1}$, and an on stream time of 42 hours. The naphtha feed for all runs is substantially the same. Some of the catalyst samples, namely Catalysts C, D, F, and G, are tested two times in the pilot plant as depicted in the figures.

Figure 2:
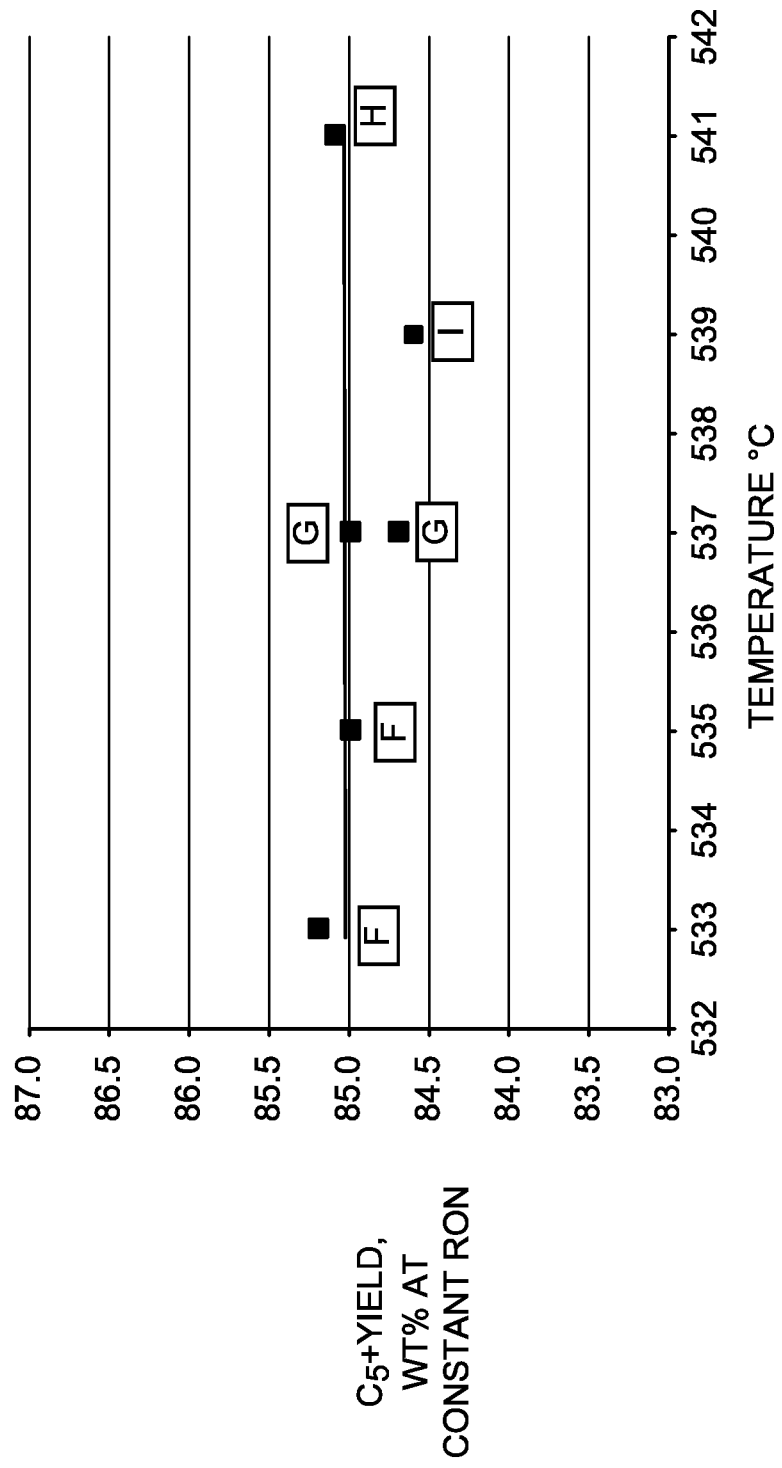
FIG. 2 is a graphical depiction of several samples comparing $C5^+$ yield in weight percent at constant RON versus temperature in Celsius.

Referring to FIG. 1, increasing the cerium content with respect to platinum increases $C_5^+$ yield at a constant 103.2 RON operation. Particularly, an atomic ratio up to about 0.94 provides an increase in $C_5^+$ yield from 85.8 wt. % to 86.2 wt. %. Catalyst D with a Ce/Pt atomic ratio of 1.39 demonstrates that a higher ratio does not further improve the $C_5^+$ yield, but reduces the catalyst activity by 1-3° C. compared to Catalyst C. Referring to FIG. 2, increasing the amount of cerium content with respect to platinum maintains a steady $C_5^+$ yield of about 85% at a constant 104.7 RON operation. Thus, it is significant and unexpected that $C_5^+$ yields do not increase when increasing amounts of cerium and lanthanum, but instead significant losses in catalyst activity are observed.

Thus, an atomic ratio of cerium:platinum of about 0.45:1.00-about 1.29:1.00, about 0.50:1.00-about 1.29:1.00, about 0.94:1.00-about 1.29:1.00, about 0.94:1.00-about 1.26:1.00, or about 1.00:1.00-about 1.26:1.00 can yield significant and unexpected results.

EXAMPLE 2

Additional catalyst samples are produced, as made by Example 1. The compositions and properties of these samples are depicted below:

TABLE 4

| Catalyst | Pt (wt. %) | Sn (wt. %) | Ce (wt. %) | Cl (wt. %) | ABD (g/cm³) | Ce/Pt (atomic ratio) |
|---|---|---|---|---|---|---|
| L | 0.290 | 0.30 | 0.00 | 1.0 | 0.570 | 0.00 |
| M | 0.292 | 0.29 | 0.25 | 1.1 | 0.566 | 1.19 |
| N | 0.290 | 0.29 | 0.25 | 1.1 | 0.576 | 1.21 |
| O | 0.299 | 0.30 | 0.27 | 1.0 | 0.559 | 1.26 |

For Catalysts M, N, and O containing cerium, additional properties are provided including the metal concentration data obtained by SEM:

TABLE 5

| Catalyst | Cl/Ce (atomic ratio) | Surface Layer Ce average in 100 micron layer, normalized mass percent | Center Core Ce normalized mass percent | Ratio of Surface/Center wt./wt. |
|---|---|---|---|---|
| M | 17.4 | 1.00 | 0.70 | 1.44 |
| N | 17.2 | 1.00 | 0.57 | 1.75 |
| O | 14.5 | 1.00 | 0.66 | 1.51 |

Pilot plant tests are conducted with Catalysts L-N, similar to Example 1. However, a different pilot plant is utilized, thus the temperature to achieve the target of about 103.3 RON is slightly different. Catalysts M and N are combined and well mixed prior to loading into the reactor for pilot plant testing. The naphtha feed is substantially the same for all runs. The results are depicted as follows:

TABLE 6

| Catalyst | Temperature (° C.) | C5+ Yield wt. % |
|---|---|---|
| L | 516 | 85.5 |
| L | 514 | 85.2 |
| M | 517 | 86.1 |
| N | | |

By calculating the relative temperature and C5+ yields to a reference Catalyst L with 0.0 wt. % cerium, the results depict that the C5+ yields are 0.6-0.9 wt. % greater for Catalysts M plus N with only an increase of 1-3° C. for constant RON operation. This demonstrates the significant higher yields with only a catalyst activity decrease of 1-3° C. for a Ce/Pt ratio of about 1.2:1. This temperature difference is consistent with Catalyst C of Example 1. Particularly, FIG. 1 depicts a temperature difference of 2-3° C. for Catalyst C (relevant to the exemplary embodiments herein) versus 0.0 wt. % cerium for comparative Catalyst A.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A catalyst for catalytic reforming of naphtha, comprising:
   A) a noble metal comprising one or more of platinum, palladium, rhodium, ruthenium, osmium, and iridium;
   B) a lanthanide-series metal comprising one or more elements of atomic numbers 57-71 of the periodic table; and
   C) a support; wherein an average bulk density of the catalyst is about 0.300-about 0.620 gram per cubic centimeter, an atomic ratio of the lanthanide-series metal:noble metal is less than about 1.3:1, and the lanthanide-series metal is distributed at a concentration of the lanthanide-series metal in a 100 micron surface layer of the catalyst greater than one times but less than or equal to 1.75 times a concentration of the lanthanide-series metal at a central core of the catalyst.

2. The catalyst according to claim 1, wherein the lanthanide-series metal comprises cerium and an atomic ratio of cerium:noble metal is about 0.50:1.00-about 1.29:1.00.

3. The catalyst according to claim 1, wherein the lanthanide-series metal comprises cerium and an atomic ratio of cerium:noble metal is about 0.94:1.00-about 1.26:1.00.

4. The catalyst according to claim 1, wherein the lanthanide-series metal comprises cerium and an atomic ratio of cerium:noble metal is about 1.00:1.00-about 1.26:1.00.

5. The catalyst according to claim 1, wherein the lanthanide-series metal comprises cerium and the noble metal comprises platinum.

6. The catalyst according to claim 5, wherein an atomic ratio of cerium:platinum is about 0.94:1.00-about 1.29:1.00.

7. The catalyst according to claim 5, wherein an atomic ratio of cerium:platinum is about 0.94:1.00-about 1.26:1.00.

8. The catalyst according to claim 5, wherein an atomic ratio of cerium:platinum is about 1.00:1.00-about 1.26:1.00.

9. The catalyst according to claim 1, wherein the average bulk density of the catalyst is about 0.555-about 0.580 gram per cubic centimeter.

10. The catalyst according to claim 1, wherein the catalyst further comprises a group 14 metal of the periodic table.

11. The catalyst according to claim 1, further comprises tin.

12. The catalyst according to claim 11, wherein the catalyst comprises no more than about 5%, by weight, tin.

13. The catalyst according to claim 1, further comprises a halide.

14. The catalyst according to claim 13, wherein the halide comprises chloride with an atomic ratio of chloride:cerium of about 14:1-about 20:1.

15. The catalyst according to claim 1, wherein the support comprises an alumina.

16. A catalyst for catalytic reforming of naphtha, comprising:
   A) platinum;
   B) cerium;
   C) chloride; and
   D) a support; wherein an average bulk density of the catalyst is about 0.300-about 0.620 gram per cubic centimeter, an atomic ratio of cerium:platinum is less than 1.3:1, an mole ratio of chloride:cerium of about 14:1-about 20:1, and cerium is distributed at a concentration in a 100 micron surface layer of the catalyst greater than one times but less than or equal to 1.75 times a concentration of cerium at a central core of the catalyst.

17. The catalyst according to claim 16, wherein the atomic ratio of cerium:platinum is about 0.94:1.00-about 1.26:1.00.

18. The catalyst according to claim 16, wherein the catalyst further comprises a group 14 metal of the periodic table.

19. A reforming process, comprising:
   A) charging a hydrocarbon feedstock and a hydrogen-rich gas to a reforming zone; and
   B) contacting the hydrocarbon feedstock and the hydrogen rich gas in a reactor in the reforming zone wherein the catalyst comprises:
      1) a noble metal comprising one or more of platinum, palladium, rhodium, ruthenium, osmium, and iridium;
      2) a lanthanide-series metal comprising one or more elements of atomic numbers 57-71 of the periodic table; and
      3) a support; wherein an average bulk density of the catalyst is about 0.300-about 0.620 gram per cubic centimeter, an atomic ratio of the lanthanide-series metal:noble metal is less than about 1.3:1, and the lanthanide-series metal is distributed at a concentration of the lanthanide-series metal in a 100 micron surface layer of the catalyst greater than one times but less than or equal to 1.75 times a concentration of the lanthanide-series metal at a central core of the catalyst.

20. The reforming process according to claim 19, further comprising continuously regenerating the catalyst.

* * * * *